United States Patent
Pannala et al.

(10) Patent No.: US 7,092,967 B1
(45) Date of Patent: Aug. 15, 2006

(54) LOADABLE UNITS FOR LAZY MANIFESTATION OF XML DOCUMENTS

(75) Inventors: Syam Pannala, Mountain View, CA (US); Eric Sedlar, San Francisco, CA (US); Bhushan Khaladkar, Mountain View, CA (US); Ravi Murthy, Fremont, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 488 days.

(21) Appl. No.: 10/256,777

(22) Filed: Sep. 27, 2002

Related U.S. Application Data

(60) Provisional application No. 60/326,052, filed on Sep. 28, 2001, provisional application No. 60/378,800, filed on May 7, 2002.

(51) Int. Cl.
*G06F 17/30* (2006.01)
(52) U.S. Cl. .................. 707/104.1; 715/513; 715/514; 707/3; 707/10; 707/101
(58) Field of Classification Search ................ 707/101, 707/102, 104.1, 103 R; 715/517
See application file for complete search history.

(56) References Cited

U.S. PATENT DOCUMENTS

| 5,295,261 A | 3/1994 | Simonetti ................... 395/600 |
| 5,404,513 A | 4/1995 | Powers et al. |
| 5,467,471 A | 11/1995 | Bader ......................... 395/600 |
| 5,680,614 A | 10/1997 | Bakuya et al. |
| 5,724,577 A | 3/1998 | Exley et al. ................ 395/611 |
| 5,734,887 A | 3/1998 | Kingberg et al. ........... 395/604 |
| 5,878,415 A | 3/1999 | Olds |
| 5,974,407 A | 10/1999 | Sacks |
| 5,987,506 A | 11/1999 | Carter et al. |
| 6,003,040 A | 12/1999 | Mital et al. |
| 6,038,563 A | 3/2000 | Bapat et al. |
| 6,055,544 A | 4/2000 | DeRose et al. |
| 6,061,684 A | 5/2000 | Glasser et al. |
| 6,128,610 A | 10/2000 | Srinivasan et al. |

(Continued)

FOREIGN PATENT DOCUMENTS

WO    WO 00/49533    8/2000

(Continued)

OTHER PUBLICATIONS

Lo et al., "A system for accessing componentized, virtual XML documents", IEEE, 2001.*

(Continued)

*Primary Examiner*—Jean M. Corrielus
(74) *Attorney, Agent, or Firm*—Marcel K. Bingham

(57) ABSTRACT

Described herein is a system for "lazy" manifestation of XML documents. In lazy manifestation, only portions of an XML document that contain data of interest (e.g., a particular element or attribute requested by an application) are manifested. The term "manifesting a portion of an XML document" refers to creating an in-memory representation of the portion and incorporating it into existing in-memory representation of an XML document, if any. These portions are referred to herein as a loadable unit. A loadable unit is a set of one or more nodes in an XML document, where when there is need to manifest a node in the set, other nodes in the loadable unit are manifested too. Loadable units may, but not necessarily, correlate to content structures that store the nodes. A loadable unit may be the nodes whose content is contained in a row.

16 Claims, 2 Drawing Sheets

U.S. PATENT DOCUMENTS

| | | | |
|---|---|---|---|
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,571,231 B1 | 5/2003 | Sedlar | 707/1 |
| 6,604,100 B1 | 8/2003 | Fernandez et al. | |
| 6,636,845 B1 | 10/2003 | Chau et al. | |
| 6,662,342 B1 | 12/2003 | Marcy | |
| 6,718,322 B1 | 4/2004 | Brye | 707/3 |
| 6,725,212 B1 | 4/2004 | Couch et al. | |
| 6,754,661 B1 | 6/2004 | Hallin et al. | 707/100 |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1* | 11/2004 | Mohr et al. | 715/517 |
| 6,836,857 B1* | 12/2004 | Ten-Hove et al. | 714/34 |
| 6,964,025 B1* | 11/2005 | Angiulo et al. | 715/838 |
| 2002/0056025 A1 | 5/2002 | Qui et al. | |
| 2002/0116371 A1* | 8/2002 | Dodds et al. | 707/3 |
| 2002/0133484 A1 | 9/2002 | Chau et al. | |
| 2002/0143512 A1* | 10/2002 | Shamoto et al. | 703/17 |
| 2002/0156811 A1* | 10/2002 | Krupa | 707/513 |
| 2002/0184188 A1* | 12/2002 | Mandyam et al. | 707/1 |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0078906 A1* | 4/2003 | Ten-Hove et al. | 707/1 |
| 2003/0093672 A1 | 5/2003 | Cichowlas | |
| 2003/0101194 A1 | 5/2003 | Rys et al. | |
| 2003/0172135 A1 | 9/2003 | Bobick et al. | |
| 2003/0182624 A1 | 9/2003 | Large | |
| 2004/0043758 A1 | 3/2004 | Sorvari et al. | |
| 2004/0064466 A1 | 4/2004 | Manikutty et al. | |
| 2004/0176958 A1 | 9/2004 | Salmenkaita et al. | |
| 2004/0225680 A1 | 11/2004 | Cameron et al. | |
| 2005/0050058 A1 | 3/2005 | Jain et al. | |
| 2005/0050092 A1 | 3/2005 | Jain et al. | |

FOREIGN PATENT DOCUMENTS

| | | |
|---|---|---|
| WO | WO 01/59602 A1 | 8/2001 |
| WO | WO 01/61556 A1 | 8/2001 |

OTHER PUBLICATIONS

Schmidt et al., "Why and how to Benchmark XML database", IEEE, vol. 30, No. 3, Sep. 2001.*

Zisman et al., "Using XML to build consistency rules for distributed specifications", IEEE, 2000.*

Jussi Myllymaki, "Effective web data extraction with standard XML technologies", IEEE, May 1-5, 2001.*

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Written Opinion, Application No. PCT/US03/35551 (8 pages).

Current claims in PCT/US03/35551, pp. 20-23.

Chakraborty, Krishnendu, "The XML Garbage Collector", The Source for Developers, Sun Developer Network Site XP-002297849, Mar. 2002.

International Preliminary Examination Report, Application No. PCT/US03/35551, pp. 1-17.

Written Opinion, Application No. PCT/US03/35551.

Current claims in PCT/US03/35551, pp. 1-4.

Daniele Braga et al., "A Graphical Environment to Query XML Data with Query," Proceedings of the Fourth International Conference on Web Information Systems Engineering (WISE '03), 2003, IEEE, 10 pages.

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, 20 (1991) Jun., No. 2, New York, US, XP 000364619, pp. 50-59.

Josephine Cheng, et al., "IBM DB2 XML Extender," IEEE, ICDE '00 Conference, San Diego, Feb. 2000, 128 pages.

* cited by examiner

LOADABLE UNITS FOR LAZY MANIFESTATION OF XML DOCUMENTS

RELATED APPLICATIONS

The present application claims priority from the following U.S. Provisional Patent Applications, the entire contents of which are incorporated herein by reference for all purposes:

U.S. Provisional Patent Application No. 60/326,052, filed on Sep. 28, 2001, entitled File Based Access Provided Within a Database System, by Eric Sedlar and Viswanathan Krishnamurthy;

U.S. Provisional Patent Application No. 60/378,800, filed on May 7, 2002, entitled SQL Access to Data that Provides a File System Abstraction, by Nipun Agarwal, Ravi Murthy, Eric Sedlar, Sivasankaran Chandrasekar, Fei Ge, Syam Pannala, Neema Jalali and Muralidhar Krishnaprasad.

The present application is also related to the following U.S. patent Applications, the entire contents of which are incorporated herein by reference for all purposes:

U.S. patent application Ser. No. 10/260,138, filed on equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on equal day herewith, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on equal day herewith, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/259,278, filed on equal day herewith, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on equal day herewith, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on equal day herewith, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/260,381, filed on equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

FIELD OF THE INVENTION

The present invention relates to techniques for accessing XML data, and in particular, efficiently accessing data stored in an XML document.

BACKGROUND OF THE INVENTION

The number of businesses exchanging information electronically is proliferating. Businesses that exchange information have recognized the need for a common standard for representing data. Extensible Markup Language ("XML") is rapidly becoming the common standard for representing data.

XML describes and provides structure to a body of data, such as a file or data packet, referred to herein as an XML document. XML standards provide for tags that delimit sections of an XML document referred to as XML elements or elements.

An element may contain various types of data, including element attributes and other elements. An element that is contained by another element is referred to as a descendant of that element. By defining an element that contains attributes and descendant elements, the XML document defines parent-child hierarchical relationships between the element, its descendant elements, and its attributes.

The term node is used to refer to individual elements and element attributes in an XML document. Thus, an XML document defines a hierarchy of nodes having parent-child relationships. Such a hierarchy is referred to herein as a node tree or a node hierarchy.

The term attribute is used herein to refer to a discrete part or element of a structure, such as a data structure or an object that belongs to an object type according to the object-oriented methodology. An attribute may be a complex construct containing one or more other attributes, referred to herein as a member of the attribute. XML standards provide for element attributes in the form of name-value pairs. While the meaning of the term attribute, as used herein, encompasses element attributes, the term is not so limited.

Industry standards define structures for representing XML documents. One such standard is the Document Object Model (DOM), promulgated by the World Wide Web Consortium (W3C).

In order for a computer to operate on an XML document, an in-memory representation of the XML document is generated. In general, an XML document is loaded from a storage device (e.g., a disk that stores files that contain XML entities) to generate in-memory data structures used to represent an XML document. The in-memory data structures are manipulated by computer processes executing software and programs. The process of loading an XML document into memory and generating an in memory representation of the XML document is referred to as manifestation or manifesting an XML document. Typically, applications access and manipulate the in-memory data structures created by manifestation through an API.

Under conventional approaches for manifestation, when an XML document is manifested, the entire XML document is manifested. XML documents can be very large, and thus require a significant amount of memory when manifesting them. Some XML documents are so large that memory needed to manifest them far surpasses the memory capacity of many computers.

Based on the foregoing, it is desirable to provide a mechanism that reduces that amount of memory needed to manifest an XML document.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
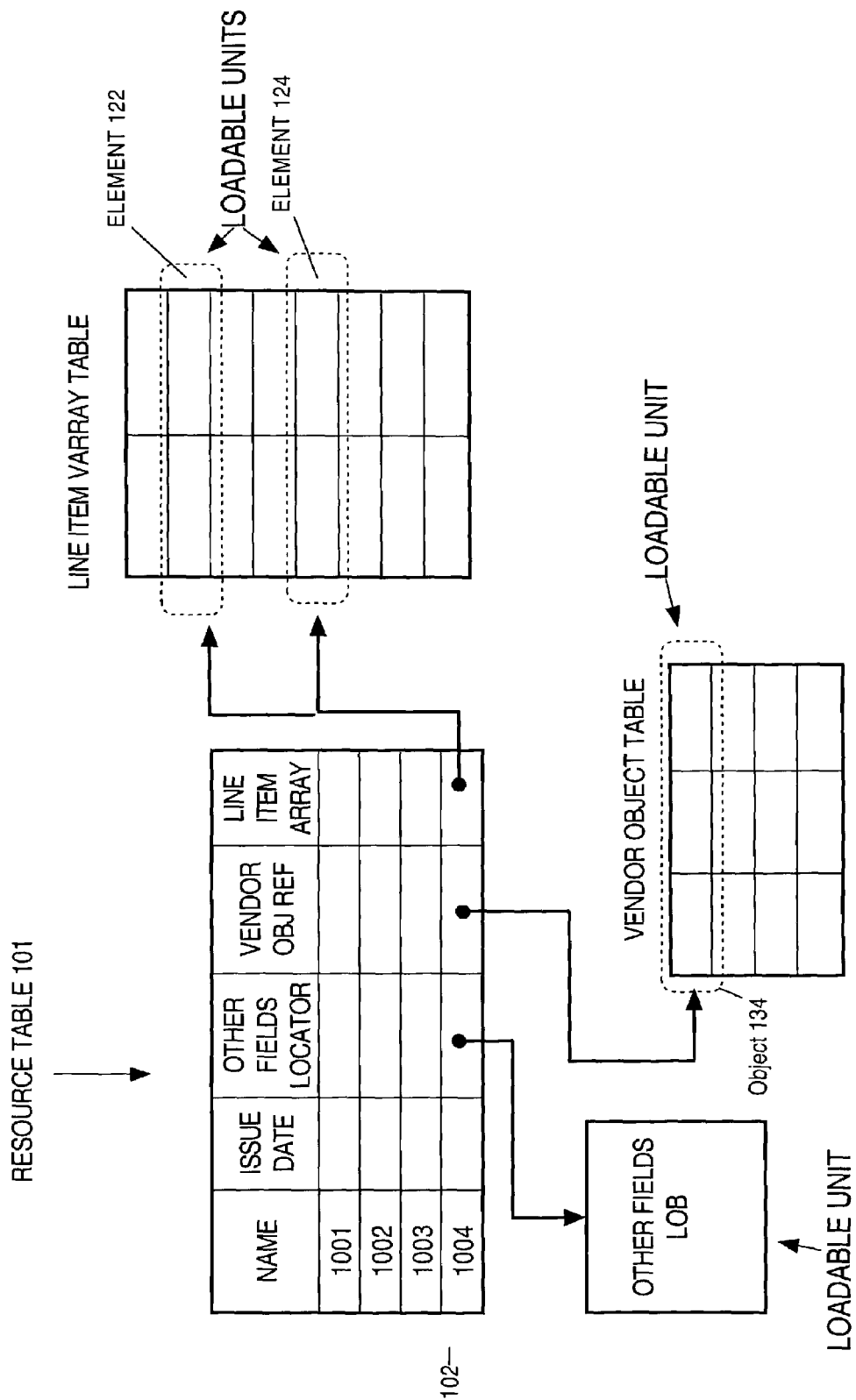
FIG. 1 is a block diagram of object-relational structures and parts of them that form loadable units.

A method and apparatus for accessing information using partitioned indexes is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a system for "lazy" manifestation of XML documents. In lazy manifestation, only portions of an XML document that contain data of interest (e.g., a particular element or attribute requested by an application) are manifested. The term "manifesting a portion of an XML document" refers to creating an in-memory representation of the portion and incorporating it into existing in-memory representation of an XML document, if any. These portions are referred to herein as a loadable unit. A loadable unit is a set of one or more nodes in an XML document, where when there is need to manifest a node in the set, other nodes in the loadable unit are manifested too.

Loadable units may, but not necessarily, correlate to content structures that store the nodes. A loadable unit may be the nodes whose content is contained in a row. For example, a row contains the content of the children nodes of a parent node. The children nodes include a first child node, a second child node, and so forth. When the need arises to manifest the first child node, it and the other children nodes in the row are manifested. In this way, loadable units are loaded on demand.

There are many types of loadable units. In a database server that manages XML data, loadable units can be nodes stored in any of a variety of "content structures" used by the database server to store portions of an XML document, as illustrated below. Loadable units may contain data in addition to the content of an XML document. For example, a row may contain "locators" to other content structures that hold content of an XML document. The term locators is used herein to refer to data structures that contain data used to locate another structure that holds data managed by a database server. An example of a locator is an object reference.

Lazy manifestation of an XML document has many advantages that stem from the fact that applications that access an XML document are typically only interested in data stored in a portion of the XML document. Under conventional approaches, the whole XML document was manifested, even though only a portion of the document contained the data of interest. On the other hand, when an XML document is lazily manifested, only those portions of an XML document that need to be manifested in order to get the data of interest are manifested. Thus, rather than performing the work of reading all the XML document from persistent storage and creating in-memory data structures needed to manifest all the XML document, under lazy manifestation, less processing of this kind is performed to manifest the smaller portion of an XML document needed to get the data of interest. For big documents of which the data of interest is only a small part, the work savings can be immense.

Lazy manifestation not only reduces the amount work that must be performed to access data of interest, but the amount of memory needed, thereby improving scalability. Scalability is improved because XML documents that are too large to completely manifest within the amount memory available on a computer, may be manifested using a smaller amount of memory that is available on the computer. Furthermore, reducing the amount of memory and work needed to a process an XML document leaves more memory and processing power available to other processes and users on a computer system, allowing a computer to support more users.

Illustrative Loadable Units in a Database Server

Standards for XML define a schema language for specifying the structure of an XML document. XML documents written in the schema language for the purpose of defining structures for XML documents are referred to herein as XML schema documents. The structure defined by an XML schema document is referred to herein as an XML schema.

According to an embodiment of the present invention, a database server has the ability to interpret an XML schema document and create or modify object-relational structures needed to support the XML schema. The object-relational structures include database objects, like relational tables, object tables, and object types. The database server creates a mapping of constructs defined by the XML schema to the object-relational structures. An XML schema document may contain annotations that specify the particular object-relational structures to use to support an XML schema. The database server stores instances of the XML schema in the structures. Some of these object-relational structures, or parts of them (e.g. rows), serve as loadable units. Examples of how XML schemas and XML documents are supported in this way may be found in U.S. patent application Ser. No. 10/259,278, filed on equal day herewith, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal.

FIG. 1 is a block diagram of illustrative object-relational structures that may be used to store instances of XML schemas. Resource table 101 is a table that contains rows, where each row corresponds to an XML document. The XML document is an instance of an XML schema that models a purchase order ("PO"). The XML document that defines the model of the PO is referred to herein as the PO schema. Instances of a PO schema are referred to herein as a PO document.

Resource tables are used to store hierarchical data, such as an XML document, and are described in more detail in, for example, U.S. patent application Ser. No. 10/256,524, filed on equal day herewith, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali. Each row in the resource table may store some of the attributes of a PO document that are defined by the XML schema, other attributes are stored in other content structures.

The PO schema defines schema attributes to model various aspects of a PO. For purposes of exposition, only a small set of the possible schema attributes that could be used to model a PO are elaborated here. This set of schema attributes include a unique name attribute, issue date attribute, vendor attribute, line items list attribute, as well as "other fields". The term other fields is used to denote a large set of discrete and separate schema attributes. Columns in resource table 101 correspond to one of these schema attributes. The columns may hold content for a schema attribute of a PO document, while other columns refer to object-relational structures ("content structures") that hold content of a schema attribute of the PO document. The object-relational structures, or parts of them, store loadable units.

Columns in resource table 101 that hold content include NAME and ISSUE DATE. NAME corresponds to the schema attribute for the unique name, and holds identifiers that uniquely identify a PO document. ISSUE DATE corresponds to the schema attribute for the issue date, and stores date values.

Columns in resource table 101 that refer to content structures include OTHER LOB LOCATOR, VENDOR OBJECT REF, and LINE ITEM ARRAY. VENDOR OBJECT REF contains references to objects in VENDOR OBJECT TABLE that contain the content for the vendor attribute of a PO document. VENDOR OBJECT TABLE is an object table. Each of the rows in VENDOR OBJECT TABLE corresponds to an object of a particular object type, and stores data for the object. For the particular row in resource table 101 that corresponds to a PO document, VENDOR OBJECT REF contains an object reference that refers to the object within the VENDOR OBJECT TABLE that contains the content of the vendor attribute for the PO document. In row 102, for example, VENDOR OBJECT REF contains a reference to object 134, the object containing the content of the vendor attribute of the PO document corresponding to row 102.

The vendor attribute is an example of an out-of-line schema attribute. For a given content structure, an out-of-line schema attribute is an schema attribute whose content is not stored in the given content structure, but is stored, at least in part, in another content structure referred to by a locator in the given content structure. An in-line schema attribute is a schema attribute whose content is stored in the given content structure. For example, with respect to row 102, the vendor attribute of the PO document is an out-of-line schema attribute, and the issue date attribute is an in-line schema attribute.

LINE ITEM ARRAY is a VARRAY column that logically contains VARRAYs. A VARRAY is an unbounded array of elements. The array elements may be primitive data types, such as a number or integer, or may be an object belonging to a particular object type. The elements of LINE ITEM ARRAY are not actually stored in the column but in a storage table. Each row of the storage table holds data for an element of a VARRAY. The storage table holds elements of multiple VARRAYS. The particular elements of a given VARRAYS are associated with a unique identifier. For the VARRAY contained in a VARRAY column of a particular row, the column contains a locator in the form of a unique identifier that identifies the row that contains the array elements of the VARRAY.

In the case of the VARRAYS contained in LINE ITEM ARRAY, the elements are objects that store data for a line items list attribute. The line items list attribute is a collection of complex constructs, each of which are referred to herein as a line item attribute. Each line item attribute represents a line item of a PO. The content of a line item attribute is stored in an element of LINE ITEM ARRAY. In row 102, for example, LINE ITEM ARRAY contains an identifier identifying elements 122 and 124, the elements containing the content of the line item attributes of the PO document corresponding to row 102.

OTHER FIELDS LOCATOR is a LOB ("large binary object) column that contains LOBs. LOBS may be thought of as a file that can be large or a stream of bytes that can be long. LOBs contained in OTHER FIELDS LOCATOR store other attributes of a PO document, which may include such things as delivery instructions and contract terms. The content contained in a LOB is structured using standard XML tags. Of course LOB columns do not actually store LOBs. Instead, they store LOB locators, which are references to structures that hold a LOB. For the LOB contained in a LOB column of a particular row, the LOB locator stored in the LOB columns refer to the particular structure that stores the LOB. In row 102, for example, OTHER FIELDS LOCATOR contains a LOB locator referring to OTHER FIELDS LOB, a LOB containing the content of the other attributes of the PO document corresponding to row 102.

Using Loadable Units for Lazy Manifestation

Various content structures just illustrated store loadable units. These include rows that store data for object 134, OTHER FIELDS LOB, and rows that store elements 122 and 125. These content structures may have in-line and out-of-line attributes. According to an embodiment of the present invention, when manifesting a loadable unit in a content structure, the in-line schema attributes are manifested while the out-of-line schema attributes are not. However, the additional data in the content structures that refers to the out-of-line schema attributes is loaded into memory. Having such information already in memory if and when the need to manifest the out-of-line schema attributes later arises enables more efficient access to the content structures referred to by the additional data.

The following example is provided to demonstrate lazy manifestation based on loadable units. In the example, an application is requesting specific portions of the PO document through an API interface of a "tree-walker". The API provides an abstraction of an XML document, such as the PO document, as an hierarchy nodes, allowing an application to access nodes that have a particular hierarchical relationship with the nodes. The tree-walker maintains a cursor that points to a current node. Many functions of an API request as data of interest one or more nodes that have a particular hierarchical tree relationship with the current node. For example, the API includes an object method for getting the first child of the current node. As the functions of the API are invoked to access the PO document, the tree-walker manifests nodes (i.e. schema attributes of the PO document) as needed to access the requested node.

Invoking of the function to access a particular node shifts the cursor to that particular node. Thus, any of the functions may be invoked to shift the cursor through the nodes in the hierarchy. In this way, the tree-walker may be used to traverse a node tree.

The application invokes an API function to get information about the name attribute of the PO document. The name attribute has not been manifested. The content for the name attribute resides in row 102. In response to the invocation, all in-line attributes of row 102 are manifested because they constitute a loadable unit. These include the name attribute as well as the issue date. Additional data in row 102, such as the locators in columns OTHER FIELDS LOCATOR, VENDOR OBJECT REF, and LINE ITEM ARRAY are loaded into memory as well.

Subsequently, the application invokes an API function to get the value of a member of the PO document's vendor attribute. The content of the vendor attribute's members are stored in the row that holds data for object 134. Because the in-line attributes of the row form a loadable unit, all of them are manifested in response to the invocation.

Subsequently, the application invokes an API function to get the value of a member of a line item attribute stored in the row for element 122. Because the row is a loadable unit, all its in-line attributes of the line item are loaded in response to the invocation.

Use Defined Loadable Units

There may be portions of an XML document, stored in separate content structures, that are typically requested when any single one of them is requested. They may be requested in this way because of the way an application behaves. For example, when an application accesses one PO document line item attribute of a line item list attribute, the application typically accesses all the line item attributes in the line item list attribute. It may be more efficient to manifest all line items when any single line attribute is manifested.

According to an embodiment of the present invention, loadable units are user configurable. The user may define loadable units by including annotations in a XML schema document. This empowers a user, who has knowledge of how an application behaves, to define loadable units that advance efficient lazy manifestation based on the expected behavior of the application. For example, the user annotates an XML schema document to define as a loadable unit a VARRAY for storing the line items list attribute. When the need arises to manifest one element of the VARRAY, all elements of the VARRAY are manifested. For example, when the need arises to manifest element 122, element 124 is also manifested. In this way, nodes in multiple content structures constitute a loadable unit. Finally, even though the content structure may contain data needed to manifest a node, the node may not be contained in the same loadable unit as other nodes in the content structure even though the content structure contains content necessary to manifest the other nodes.

Hardware Overview

Figure 2:
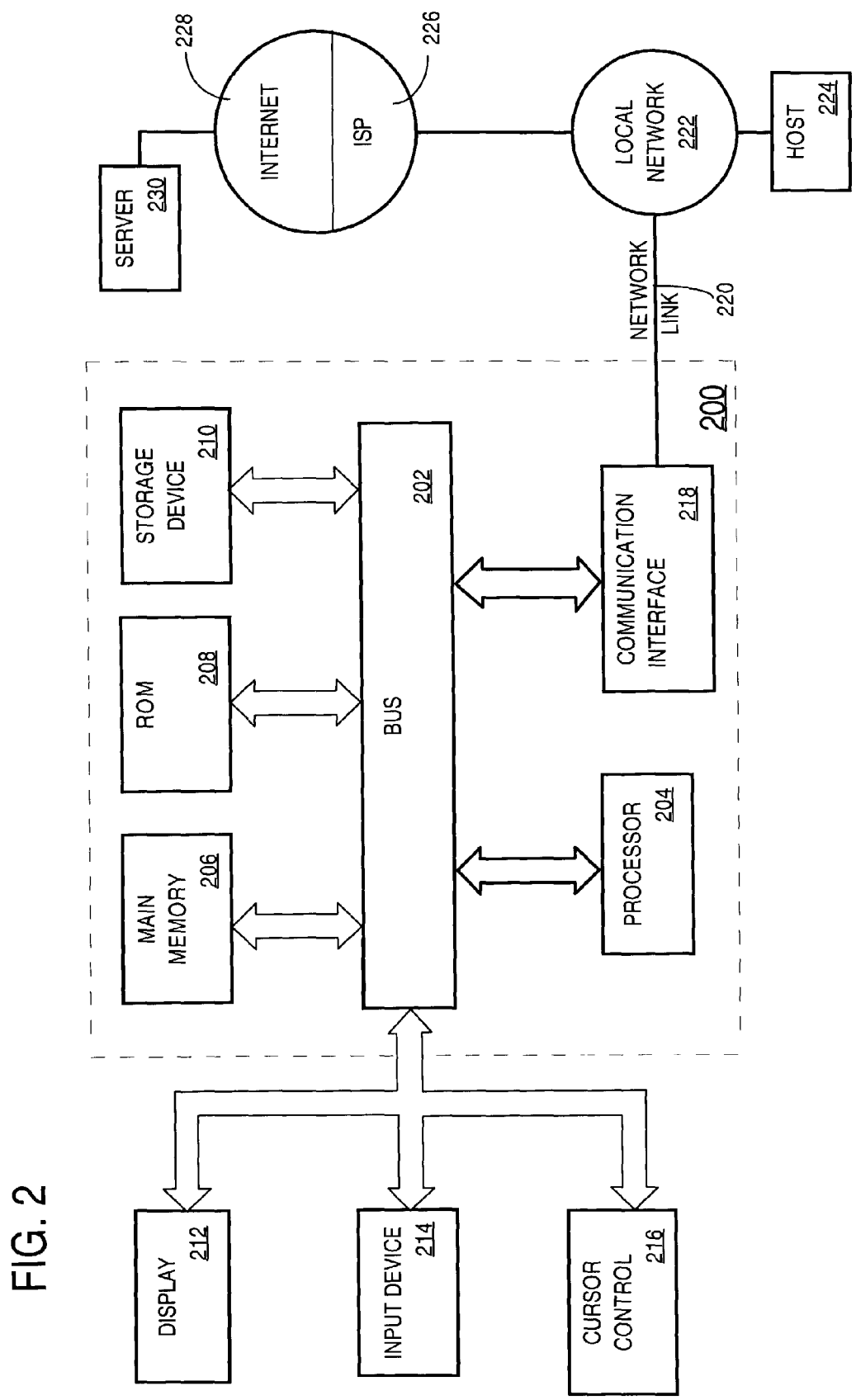
FIG. 2 is a block diagram of a computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of lazily manifesting an XML document, the method comprising the steps of:
   receiving a first request that requests a first node;
   in response to receiving said first request, manifesting only a portion of said XML document within an in-memory representation of said XML document;
   wherein each portion of multiple portions of said XML document belong to a separate loadable unit;
   receiving one or more requests for a particular node that is not represented by a node within said in-memory representation and that belongs to a respective loadable unit; and
   for each particular request of said one or more requests, incorporating within said in-memory representation a node representing the particular node requested by said each particular request by performing steps that include:
      manifesting all nodes that belong to the respective loadable unit, said all nodes that belong to said respective loadable unit including said particular node and one or more other nodes that corresponds to a sibling or descendant element of said particular node.

2. The method of claim 1, wherein:
   said particular node and said one or more other nodes are stored in a first data structure that also stores data used to locate a second data structure that stores another portion of said XML document; and
   the steps further include loading into volatile memory said data used to locate said second data structure when said all nodes from the respective loadable unit of said particular node is manifested.

3. The method of claim 1, wherein:
   said step of manifesting all nodes is performed by a database server; and
   said XML document is stored in data structures managed by said database server.

4. The method of claim 3, wherein nodes stored in a row of a table constitute a loadable unit of said XML document.

5. The method of claim 1, wherein loadable units of said XML document are defined according to user input.

6. The method of claim 1, wherein an element of a VARRAY contains said particular node of interest and said one or more other nodes.

7. The method of claim 1, wherein a large object managed by a database server contains said particular node and said one or more other nodes.

8. The method of claim 1, wherein an object that resides in an object table managed by a database server contains said particular node and said one or more other nodes.

9. A computer-readable medium carrying one or more sequences of instructions which, when executed by one or more processors, causes the one or more processors to perform the method recited in claim 1.

10. A computer-readable medium carrying one or more sequences of instructions which, when executed by one or more processors, causes the one or more processors to perform the method recited in claim 2.

11. A computer-readable medium carrying one or more sequences of instructions which, when executed by one or more processors, causes the one or more processors to perform the method recited in claim 3.

12. A computer-readable medium carrying one or more sequences of instructions which, when executed by one or more processors, causes the one or more processors to perform the method recited in claim 4.

13. A computer-readable medium carrying one or more sequences of instructions which, when executed by one or more processors, causes the one or more processors to perform the method recited in claim 5.

14. A computer-readable medium carrying one or more sequences of instructions which, when executed by one or more processors, causes the one or more processors to perform the method recited in claim 6.

15. A computer-readable medium carrying one or more sequences of instructions which, when executed by one or more processors, causes the one or more processors to perform the method recited in claim 7.

16. A computer-readable medium carrying one or more sequences of instructions which, when executed by one or more processors, causes the one or more processors to perform the method recited in claim 8.

* * * * *